(12) United States Patent
Chen et al.

(10) Patent No.: US 8,271,737 B2
(45) Date of Patent: Sep. 18, 2012

(54) CACHE AUTO-FLUSH IN A SOLID STATE MEMORY DEVICE

(75) Inventors: Richard Chen, Milpitas, CA (US); Rex Hsueh, Cupertino, CA (US); Ping Hou, Fremont, CA (US)

(73) Assignee: Spansion LLC, Sunnyvale, CA (US)

( * ) Notice: Subject to any disclaimer, the term of this patent is extended or adjusted under 35 U.S.C. 154(b) by 422 days.

(21) Appl. No.: 12/473,081

(22) Filed: May 27, 2009

(65) Prior Publication Data

US 2010/0306448 A1    Dec. 2, 2010

(51) Int. Cl.
*G06F 13/00* (2006.01)
(52) U.S. Cl. ......... 711/133; 711/118; 711/126; 711/162
(58) Field of Classification Search .................. 711/133, 711/118, 126, 162
See application file for complete search history.

(56) References Cited

U.S. PATENT DOCUMENTS

| | | | |
|---|---|---|---|
| 5,297,148 A | 3/1994 | Harari et al. | |
| 7,173,863 B2 | 2/2007 | Conley et al. | |
| 7,870,338 B2 * | 1/2011 | Iida et al. | 711/118 |
| 2006/0047888 A1 * | 3/2006 | Nishihara et al. | 711/103 |

OTHER PUBLICATIONS

Patterson, D. et al., "Computer Organization and Design," Morgan Kaufmann, 2005, pp. 466-611.

* cited by examiner

*Primary Examiner* — Connie Yoha
(74) *Attorney, Agent, or Firm* — Frommer Lawrence & Haug LLP; John W. Branch

(57) ABSTRACT

A device, system and method in which data in a write cache, that must at some point be written to non-volatile memory, is written to non-volatile memory after expiration of a threshold time period during which no new host commands are received. If either the last dirty entry is written back or a host command is received during the write-back process, the time threshold time period and auto-flush process is restarted.

20 Claims, 6 Drawing Sheets

US 8,271,737 B2

CACHE AUTO-FLUSH IN A SOLID STATE MEMORY DEVICE

TECHNICAL FIELD

The present invention relates generally to a device, system and method for improving the execution time of system standby commands and minimizing the possibility of data loss caused by unexpected power loss in a solid state drive device by auto-flushing data from a write cache to non-volatile memory.

BACKGROUND

As electronic devices become smaller and more sophisticated, there is an increase in the demand for memory that can be read faster, stores more information in a smaller package size and uses less energy. Many of these electronic devices require the ability to store large quantities of persistent data. As one example, a solid state drive ("SSD") is a data storage device that uses solid state memory to store large quantities of data in non-volatile memory. An SSD emulates a hard disk drive, is increasingly used to replace such hard disk drives in most applications, and are often packaged in standard disk drive form factors (1.8", 2.5" and 3.5"). Typically, an SSD uses non-volatile flash memory that allows the creation of more rugged and compact devices for the consumer market. The non-volatility of flash SSDs permit them to retain memory even during sudden power outages. Flash SSDs usually perform better than traditional hard drives with respect to read rates because of negligible seek time. This is because the flash SSDs have no moving parts and thus eliminate the spin up time and reduce the seek time, latency and other delays in conventional electro-mechanical disks.

One method of improving the speed performance of flash memory products is to use caching for write operations. The write time for cache memory, which is typically a volatile memory, is significantly faster than for flash memory. Thus, when a write operation occurs, the information is written into the cache memory, and then afterwards written into the flash memory at the slower transfer rate for flash write operations. The timing of the write operation from the cache to the flash memory is controlled by the write policy. In a write-through cache, a rewrite to the cache causes a synchronous write to the flash memory. Alternatively, in a write-back or a write-behind cache, writes are not immediately mirrored to the flash. Instead, the cache tracks the locations that have been written over and marks these locations as dirty. The data in these locations is written back to the non-volatile memory and then the data is removed from the cache.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
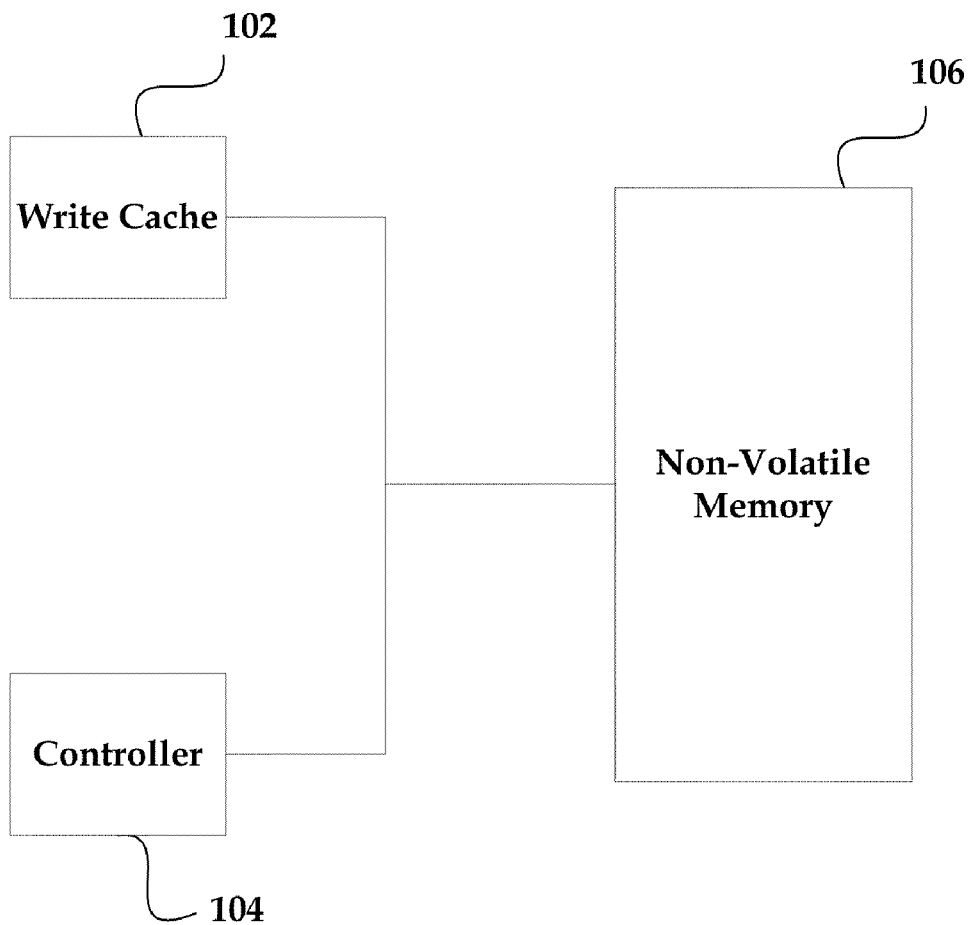
FIG. 1 shows an overall system diagram of one embodiment of the invention.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

A "solid state drive" or "SSD" is a data storage device that uses solid state memory to store persistent data. The memory typically used in an SSD is flash memory, but may be other types of non-volatile memory.

The term "flash memory" is non-volatile solid state memory that can be electrically erased and re-programmed. It is a specific type of EEPROM that is erased and re-programmed in large blocks.

The term "dirty data" means data within a write-cache that has not been mirrored to the non-volatile store or memory. As an example, data sent from the host for writing to the flash memory that is temporarily stored in write-cache is considered "dirty data" until the write to the flash memory occurs.

The term "wear leveling" is a technique for prolonging the service life of some kinds of erasable computer storage media such as flash memory. Wear leveling attempts to work around the limited number of erase cycles for certain memory, such as flash memory, by arranging data so that erasures and re-writes are distributed evenly across the medium. In this way, no single erase block prematurely fails due to a high concentration of write cycles.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

In one embodiment of the invention, a device and method is comprised of a memory device that has a solid state non-volatile memory such as a flash memory, a write cache for receiving data that is to be written to the non-volatile memory array and a processor or controller that controls the caching and write access to the non-volatile memory array. The dirty data within the cache is written to the non-volatile memory after a threshold time period has expired and during which time no host commands are received. If either the last dirty entry is written back or a host command is received during the write-back process, the write back process is stopped, the threshold time period is restarted and the process begins again.

In another embodiment of the invention, a timer is used to measure the length of the threshold time period. The timer is reset if a host command is received. If no host command is received, the timer is incremented or decremented until it reaches a threshold value, which is indicative of the expiration of the threshold time period. If the timer value reaches the threshold value, then the process of writing dirty data from the cache to the non-volatile memory array takes place. This process is interrupted on receipt of a host command or after the last of the dirty data is written from the cache to the non-volatile memory. After interruption, the process begins again with the resetting of the timer.

In another aspect of the invention, the threshold time period at which time the writing of the dirty data takes place is set so as to minimize the potential loss of data due to an unexpected power loss and to minimize the amount of time required to write dirty data from cache to the non-volatile memory on receipt of a system standby command, while maintaining the predicted lifespan of the non-volatile memory with respect to write accesses.

In another aspect of the invention, the threshold time period may be varied depending on the number of dirty entries in the cache, on the frequency of host commands received or the amount of time the particular data has remained in the cache.

Illustrative Solid State Drive

An overall system in which the invention may be implemented is shown in FIG. 1. The system contains write cache 102, controller 104 and non-volatile memory 106. Write cache 102 is typically a volatile memory that is used to temporarily store data intended for non-volatile memory 106. Data may be written to write cache 102 much faster than data may be written to non-volatile memory 106. Thus, the overall performance of the system can be improved by first writing incoming data to write cache 102, and then writing the data back to the non-volatile memory afterwards during a time when there are no read or write requests being fulfilled. Write cache 102 and non-volatile memory 106 may be controlled by controller 104. Controller 104 may implement various write-back policies that control when and how data within write cache 102 is written back to non-volatile memory 106. As one example, controller 104 may permit data to be written back to non-volatile memory 106 after the data has remained in the cache for a certain period of time and when there are no other requests for access to non-volatile memory 106.

Figure 2:
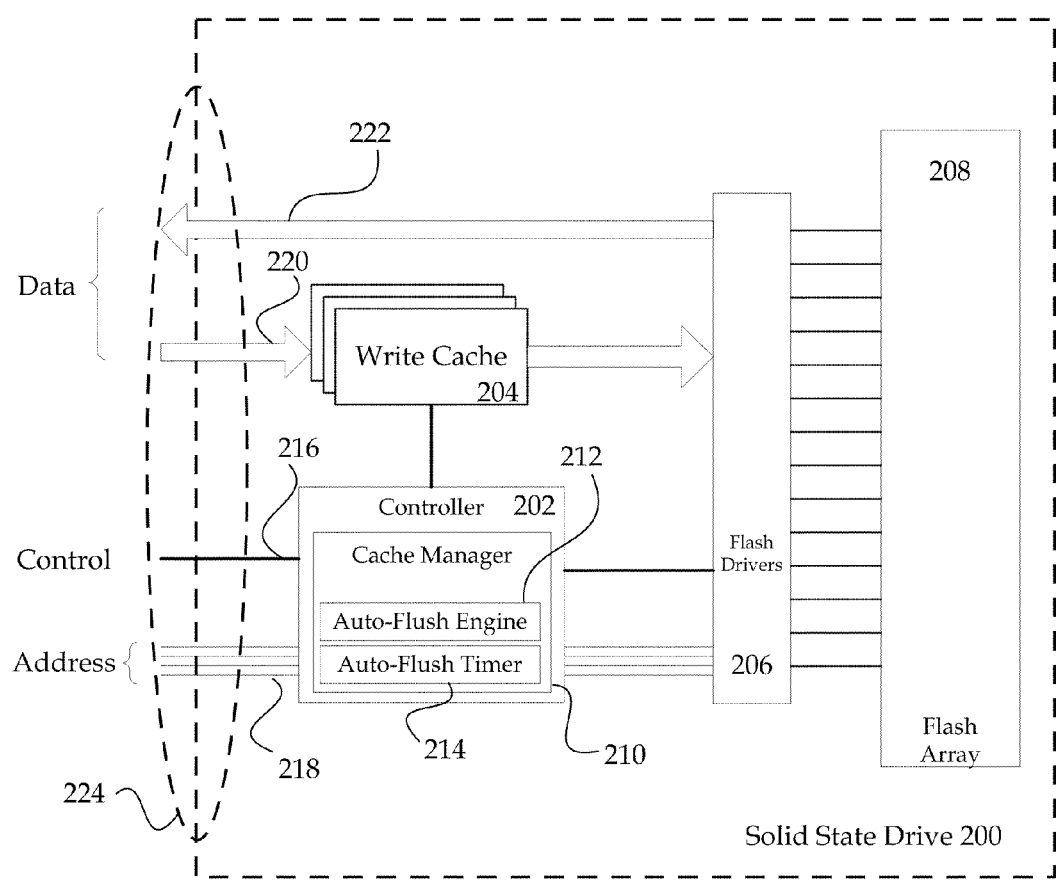
FIG. 2 is a system diagram of one embodiment of a solid state drive of the invention.

FIG. 2 shows an embodiment of a solid state drive in which the invention may be practiced. Not all the components may be required to practice the invention, and variations in the arrangement and type of the components may be made without departing from the spirit or scope of the invention. While this embodiment shows the use of the invention is a solid state drive, the invention is not so limited and may be used in other types of electronic devices utilizing solid state non-volatile memory.

Solid state drive 200 is comprised of controller 202, write cache 204, flash drivers 206 and flash array 208. Solid state drive 200 receives data, control and addressing information through host interface 224 that is comprised of data, control and addressing lines. Controller 202 may contain cache manager 210, which in turn contains auto-flush engine 212 and auto-flush timer 214. Solid state drive 200 may receive host commands through host interface 224. Host commands may be any commands executable by solid state drive 200 such as, for example, to read data, write data or power-down.

As shown in FIG. 2, data is transferred through host interface 224 to write cache 204 through data lines 220 before it is written to flash array 208 through flash drivers 206. Flash array 208 and flash drivers 206 together are one instance of non-volatile memory 106 of FIG. 1. Write cache 204 is typically a volatile memory that is used as an internal write cache for data buffering to compensate for slow write speeds of flash array 208 as compared to the rate of incoming data. Write cache 204 may be any appropriate memory device such as static random access memory (SRAM) but may consist of other types of suitable types of memory. Data is also read from flash array 208 as shown by read data lines 222. Although not shown in FIG. 2, the read data may also be cached for improved performance of the device.

Controller 202 may be a microprocessor, processor or other similar device for controlling write-caching and other flash array operations. Controller 202 controls the data operations within solid state drive 200 in accordance with control signals along control line 216 and addressing information along addressing lines 218. As an example, if the host requests data having a particular address range, controller 202 determines the location of the data in flash array 208 and carries out the necessary steps to retrieve the data and transmit the data to the host through read data lines 222.

Controller 202 may also execute control functions independent of host commands or that are transparent to the host of solid state drive 200. An example of one of these operations is managing the cache policies for write cache 104 through, for example, cache manager 210. The functions of controller 202 may be implemented through software, hardware or a combination of both. For example, auto-flush timer 214 may be implemented through a software timer, a hardware timer or a combination of a clocking pulse with software.

In one embodiment of the system, cache manager 210 may control the auto-flush function through auto-flush engine 212 and auto-flush timer 214. The auto-flush function essentially sets the write-back policy so that dirty data is written back after a threshold time period expires and during which no host requests are received. Thus, data is written from write cache 204 only after expiration of a threshold time period as determined by auto-flush timer 214 during idle periods of time for solid state drive 200 with respect to the host (that is, when no host commands are received). Auto-flush engine 212 may cause the data to be written back unless or until all write-backs are completed or a host command is received. The auto-flush write back terminates on receipt of a host command, so that the controller 202 may service the host command. In essence, the host command is given priority over the auto-flush function. In another embodiment, certain types of host commands may be given lower priority over the auto-flush function priority.

In another embodiment of the system, the write back policy may be set so that each set of data is written back depending on the amount of time the data has been in write cache 204, depending on the write location of the data within flash array 208 or the frequency of access to data within solid state drive 200 by the host.

The write back policy may also integrate various data leveling mechanisms to maximize the life of flash array 208. Wear leveling is a technique for prolonging the service life of some kinds of erasable computer storage media, such as flash memory. EEPROM and flash memory media have individually erasable segments, each of which can be put through a limited number of erase cycles before becoming unreliable. This can be anywhere between 10,000 and 1,000,000 cycles, for example, for NAND flash devices. Wear-leveling attempts to work around these limitations by arranging data so that erasures and re-writes are distributed evenly across the medium. In this way, no single erase block prematurely fails due to a high concentration of write cycles. Examples of wear-leveling techniques are checksum or error-correcting code that can be kept for blocks or sectors to detect and correct errors, using a pool of reserve space for redirecting of data from failed blocks or sectors or blocks or sectors may be tracked in a least recently used queue. Wear-leveling may also be implemented in software through special-purpose file systems where media is treated as circular logs and write to them in sequential passes. The wear-leveling techniques may be implemented in controller 202 and be transparent to the host.

Generalized Operation

Figure 3:
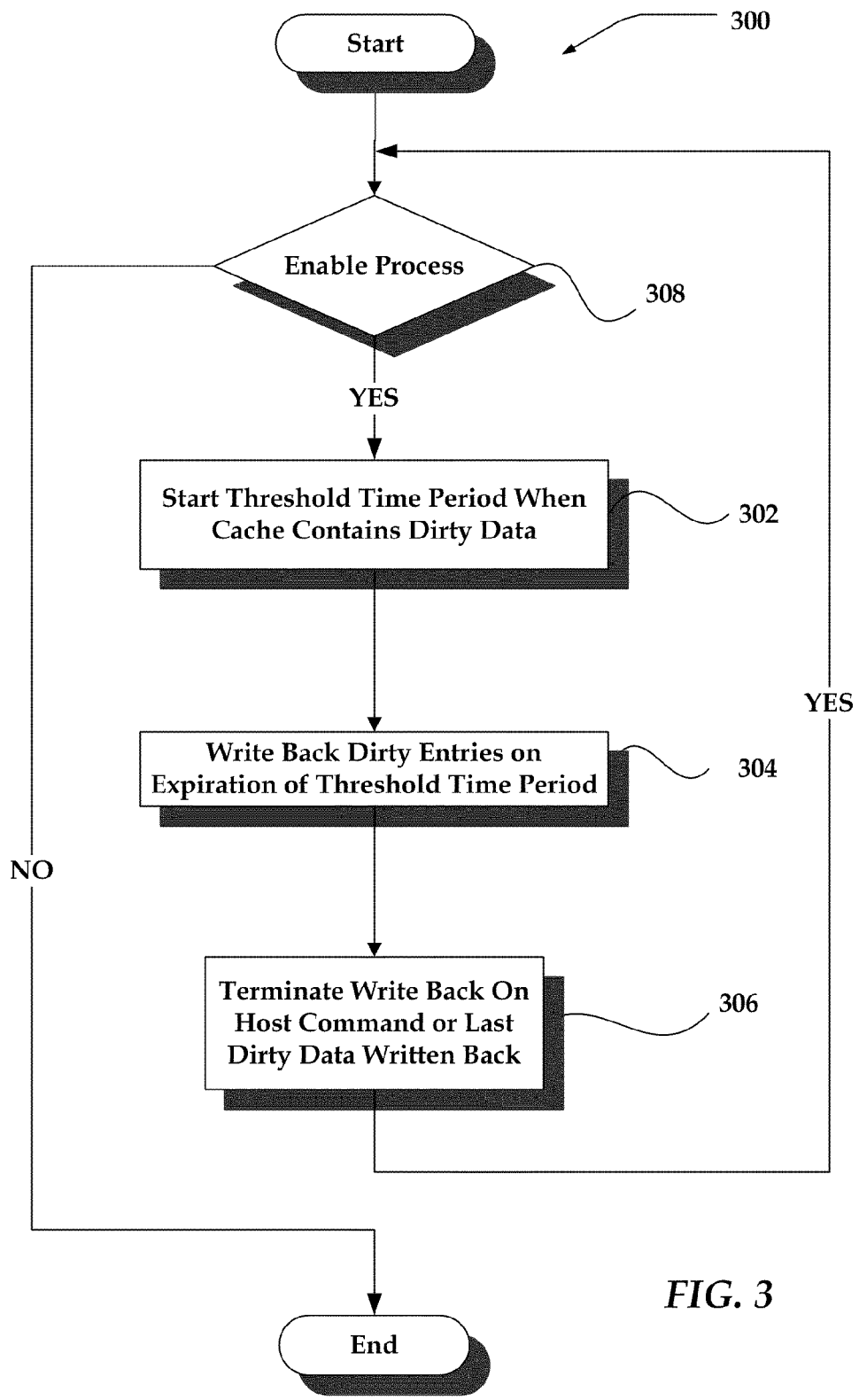
FIG. 3 shows a flow diagram for one embodiment of the auto flush routine of the present invention.

The flow of one embodiment of the invention is shown in flow 300 of FIG. 3. The process begins in block 308 where the system determines whether the auto-flush process is enable. If the auto-flush process is enable, the process begins with block 302. If not, then the process ends. Block 302 begins with the starting of the threshold time period. This may take place by use of a timer, a clock, by the number of cycles or any other method of demarking the passage of time. The threshold time period would only be started when the cache contains dirty data. The threshold time period may be a predetermined value based upon the desired performance characteristics of the solid-state drive or it may be a variable time period depending on the amount of data in the cache, the rate of reading or writing of data or similar characteristics. Next, when the threshold time period ends or is completed, the dirty entries in the cache are written back into the nonvolatile memory as shown in block 304. This write back occurs so long as no host command is received as shown in block 306. On receipt of a host command, the write back operation is immediately stopped and the host command is serviced. After receiving the host command, the threshold time period may be reset so that it restarts again. If no host command is received, then the write back of dirty entries continues until the last of the dirty data is written back. This process will be continued as shown in decision block 308 up until, for example, a standby command is received. As one example, in the case of receiving a standby command, the system would write back all dirty data entries, disable auto-flush process and commence with the shutdown process.

Figure 4:
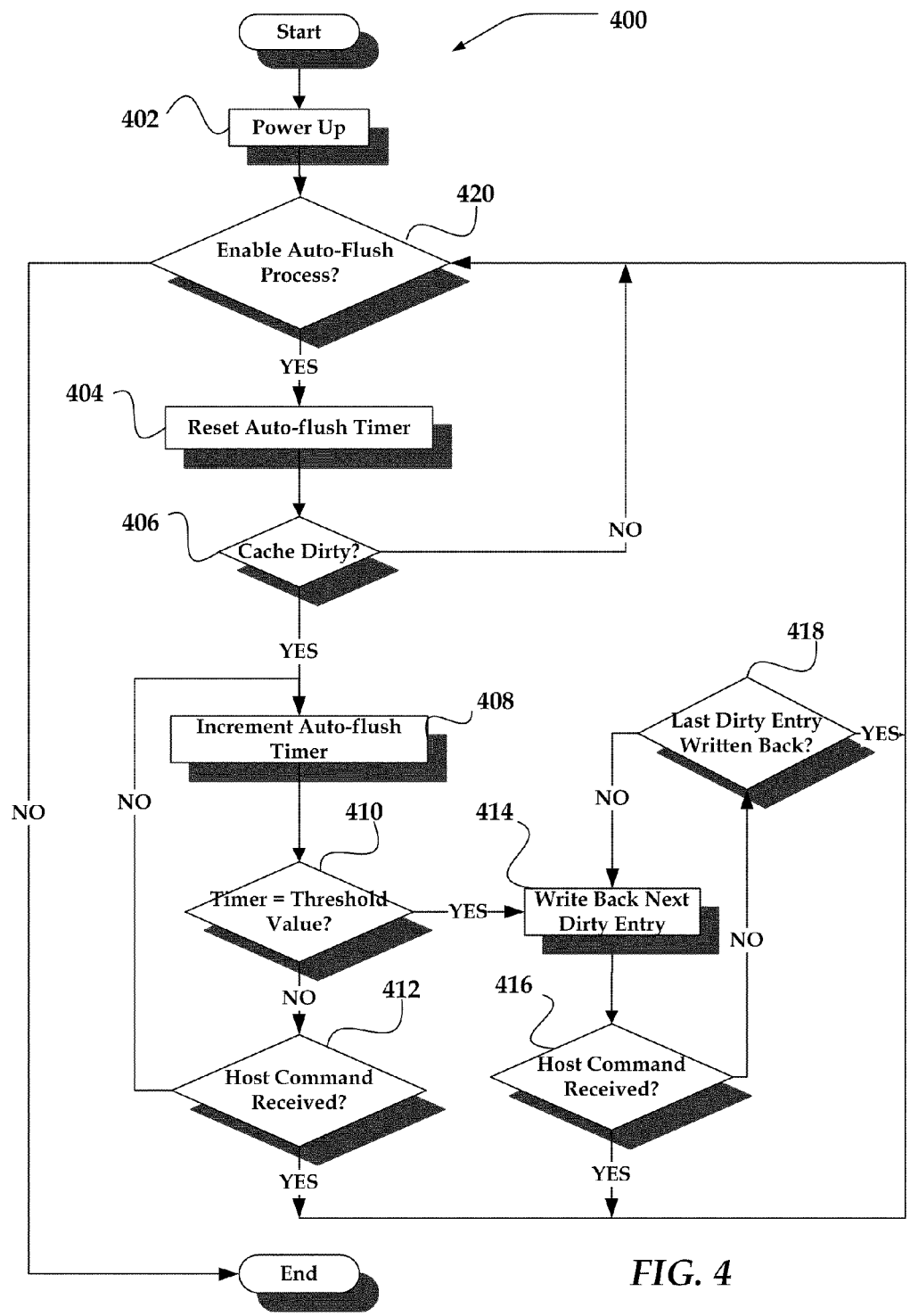
FIG. 4 shows a flow diagram for another embodiment of the auto flush routine of the present invention.

The operation of another embodiment of the invention will now be described with respect to FIG. 4. FIG. 4 illustrates a logical flow diagram of one embodiment for the auto-flush engine which may be implemented, for example, through cache manager 210. After power up as indicated in block 402, the system determines whether the auto-flush process is enable in block 420. If the auto-flush process is not enable, then the process ends. If the auto-flush process is enable, the auto-flush timer is reset as shown in block 404. The timer may count up, down or have another method of demarking a period of time such as being based on a clock or similar timing device. As an example of one embodiment to illustrate the concept of the invention, the auto-flush timer will be reset to zero.

Next, a determination is made as to whether the write-cache contains dirty data as shown in decision block 406. If the cache does not contain dirty data then the auto-flush timer is reset to zero as shown in block 404. This loop would continue until the write cache contains data to be written to the flash array, that is, dirty data. Once the write cache contains data to be written to the flash array, the auto-flush timer is incremented as shown in block 408. The timer is then compared against a threshold value as shown in block 410. The threshold value may be set so that when the timer reaches the threshold value, it is an indication that the threshold time period expired. The threshold time period is a period of time in which the potential for lost data and/or lengthy times for write back after receipt of a system standby command is minimized while also maximizing the useful life of the non-volatile memory. The threshold time period depends on the intended use of the non-volatile memory and/or solid state drive device. In one embodiment of the invention, the threshold time period may be fixed for the device. In another embodiment of the invention, the threshold time period may be set by the device depending on the write caching actions that have previously taken place. For example, the threshold time period may be set depending on the previous types and/or frequency of host commands, the amount of dirty data in memory or similar factors.

If the auto-flush timer does not exceed the threshold value, then a determination is made as to whether a host command has been received as shown in decision block 412. If there is no host command, then the auto-flush timer is again incremented and the loop is repeated. If a host command is received during this loop, then a check is made whether to terminate the auto-flush process as shown in decision block 420, for example, a standby command is received. If not, then the entire loop is repeated, starting with a reset of the auto-flush timer in block 404.

In another embodiment of the system, the order of comparing the timer against the threshold value may be reversed with the determination of whether a host command is received. While the embodiment shown in FIG. 4 discloses the use of a timer incremented by software, other methods of determining a time period may be used. As one example, a clock signal may be used to delineate the threshold time period. In such an embodiment, the step of block 408 may be replaced with a determination of the value of the clock or timer.

If, on comparison of the auto-flush timer against the threshold value, the timer exceeds the threshold then the writing back of entries begins as show in the loop of blocks 414, 416, and 418. In block 414, the next dirty data entry is written from the write cache to the flash array. After writing of the next entry, the system determines if a host command has been received in decision block 416. If a host command is received, a determination is made as to whether to terminate the auto-flush routine in decision block 420, and if not, then the process begins again with block 404 wherein the auto-flush timer is reset. If no host command is received then a determination is made as to whether the last dirty data entry has been written back as shown in decision block 418. This loop continues until either a host command is received or a last dirty data entry is written back from the write cache to the flash array. After one of these events occurs, then a check is made whether to terminate the auto-flush process as shown in decision block 420, for example, a standby command is received. If not, then the entire loop is repeated, starting with a reset of the auto-flush timer in block 404. the auto-flush timer is reset to zero and the process begins again.

As apparent, if at any point during the process the host command is received, the auto-flush logic will terminate the auto-flush process and reset the timer value so that the host command can be served properly. In essence, this approach efficiently utilizes the host idle period to perform the auto-flush, and minimizes the impact on latency or serving any new host command requests.

Figure 5:
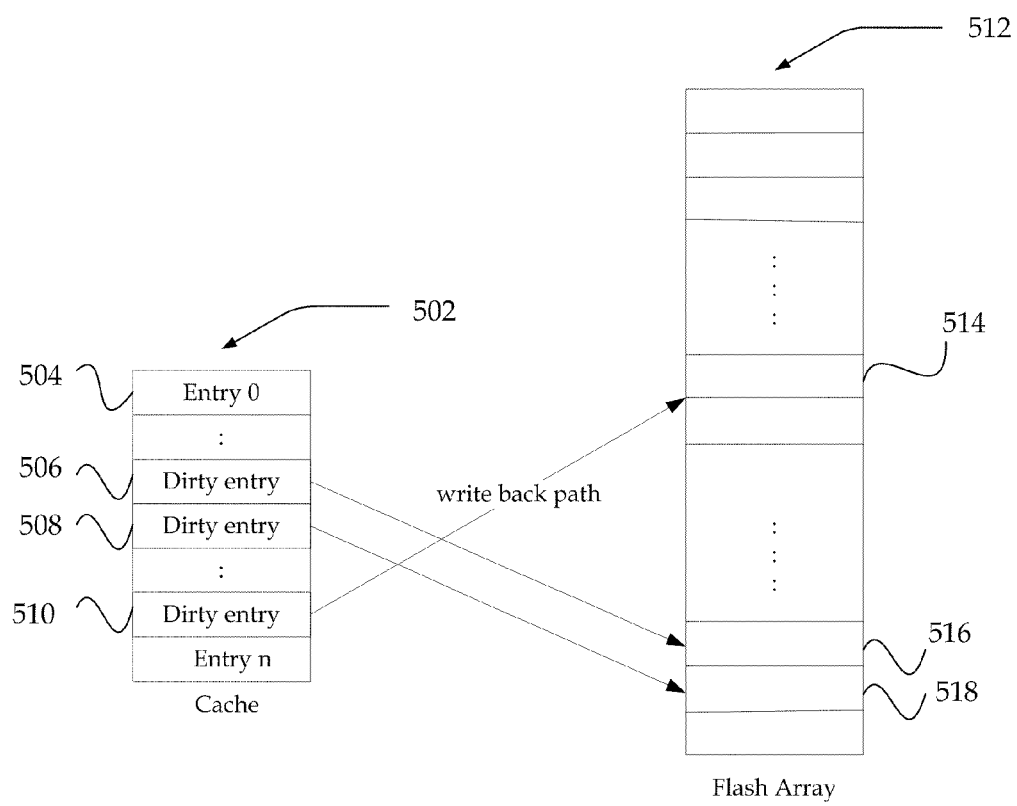
FIG. 5 shows an example of a write-back path for writing entries from cache to a flash array.

FIG. 5 shows data entries in cache 502 and a write-back path to flash array 512. Cache 502 has a number of entries only some of which may contain dirty data such as, for example, dirty entries 506, 508 and 510. In one embodiment of the invention, the dirty entries would be written back to flash array 512 based upon a simple cycling through of the data entries one at a time in order. As shown, these entries may go into various entry locations within the flash array. In another embodiment of the system, the data entries may be written back to the flash array based upon the age of the entry, the physical location of the entry within the flash array, i.e. whether located physically within the same block within the flash array, or by any other methods or algorithms for managing the cache policy.

Figure 6:
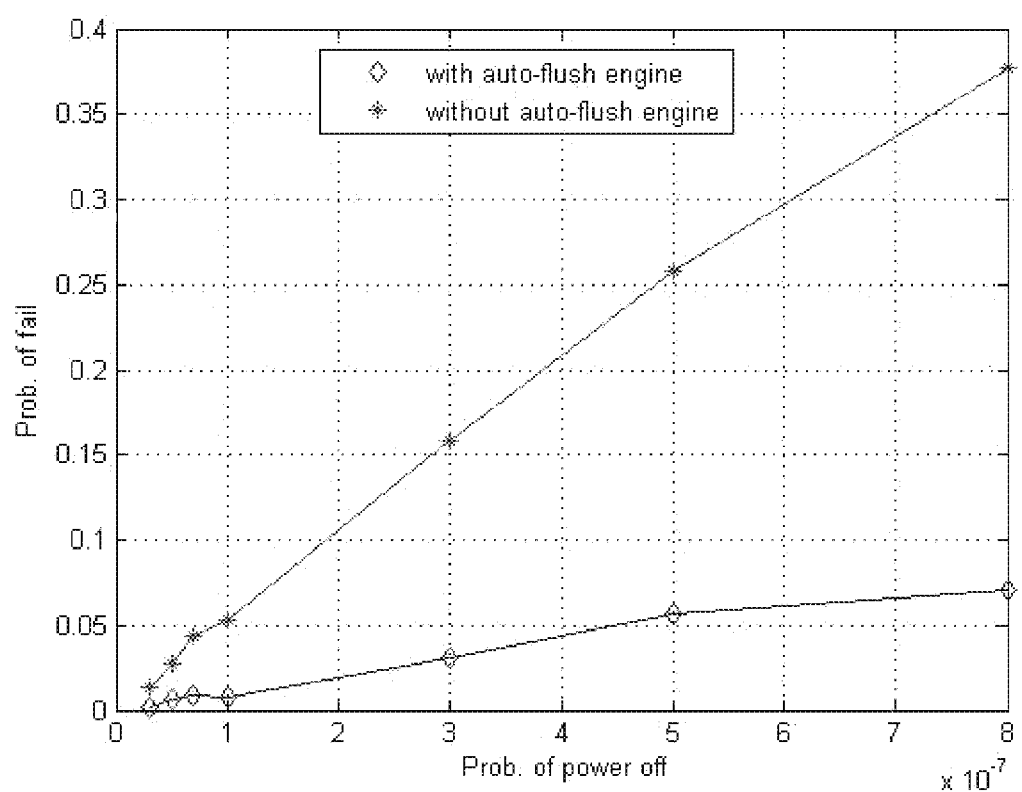
FIG. 6 shows a graph of the probability of unexpected power down event versus the possibility of lost data.

The loss of data due to unexpected power down depends on whether the cache contains any dirty data entries when the event occurs. The method in which the auto-flush engine writes back dirty data entries while the host is idle reduces the possibility of having dirty data entries when the unexpected power down occurs. This reduces the possibility of lost data. The plot shown in FIG. 6 shows the probability of an unexpected power down event against the possibility of lost data. The X axis represents the possibility of an unexpected power down event and the Y axis represents the possibility of losing data. The upper line of the graph shows the plotting of an SSD without the auto-flush engine while the lower line shows the plotting of an SSD with an auto-flush engine. Typically, the probability of data loss is down by 75% by using the auto-flush engine.

Another advantage of the auto-flush engine relates to time for the SSD to execute the system standby command. An important factor for the time required for executing the system standby command in a normal power down sequence is the amount of dirty data entries that must be written from the write cache to the flash array. The auto-flush engine reduces the dirty data entries in the write cache without hurting the system bandwidth by utilizing the host idle period to perform incremental cache write-backs. The result is that the execution time of write-backs after receipt the system standby command is reduced, which shortens the overall normal power down time. However, one drawback of the auto-flush engine is that it increases the number of write-backs to the flash array, which has the potential of reducing the lifetime of the flash array based on write or erase operations. To address this concern, various methods of applying level wearing may take place in the SSD.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A solid state memory device comprising:
a solid state non-volatile memory array;
a cache coupled to the non-volatile memory array; and
a processor arranged to control the writing of data from the cache to the non-volatile memory array and operative to enable actions including:
starting a threshold time period when the cache contains dirty data;
re-starting the threshold time period on receipt of one of a plurality of host commands;
writing the dirty data to the non-volatile memory array on expiration of the threshold time period; and terminating the writing of dirty data to the non-volatile memory array and re-starting the threshold time period when the cache contains dirty data either on receipt of one of the plurality of host commands or after a last set of dirty data from the cache is written to the non-volatile memory.

2. The memory device of claim 1, wherein the processor is operative to further enable actions including:
determining that the cache contains dirty data; and
determining the threshold time period based on a timer.

3. The memory device of claim 1, wherein the processor is operative to further enable actions including:
setting the threshold time period so that the writing of the dirty data to the non volatile memory does not exceed a maximum number of write accesses for a predicted life span of the non-volatile memory.

4. The memory device of claim 1, wherein the processor is further operative to enable actions including:
setting the threshold time period based on the number of dirty entries in the cache or the frequency of host commands.

5. The memory device of claim 1, wherein writing the dirty data to the non-volatile memory array takes place according to an amount of time that the dirty data has remained in the cache.

6. The memory device of claim 1, wherein writing the dirty data to the non-volatile memory array includes application of wear-leveling techniques.

7. The memory device of claim 1, wherein the non-volatile memory array is NAND flash memory.

8. A method for managing caching comprising:
    determining that a memory cache contains dirty data;
    starting a threshold time period when the memory cache contains dirty data;
    re-starting the threshold time period on receiving a host command of a plurality of host commands;
    writing the dirty data from the memory cache to a solid state non-volatile memory array on expiration of the threshold time period; and
    terminating the writing of dirty data from the memory cache to the solid state non volatile memory array and re-starting the threshold time period when the cache contains dirty data either on receipt of a host command of the plurality of host commands or after a last set of dirty data from the cache is written to the solid state non-volatile memory.

9. The method of claim 8, wherein the threshold time period is determined based on a timer.

10. The method of claim 8, wherein the threshold time period is set so that the writing of the dirty data to the non-volatile memory does not exceed a maximum number of write accesses for a predicted life span of the non-volatile memory.

11. The method of claim 8, further comprising:
    setting the threshold time period based on the number of dirty entries in the cache or the frequency of host commands.

12. The method of claim 8, wherein writing the dirty data to the non-volatile memory array takes place according to an amount of time that the dirty data has remained in the cache.

13. The method of claim 8, wherein writing the dirty data to the non-volatile memory array includes application of wear-leveling techniques.

14. The method of claim 8, wherein the non-volatile memory array is NAND flash memory.

15. A solid state drive comprising:
    a host interface;
    a solid state non-volatile memory array;
    a cache coupled to the host interface and the non-volatile memory array; and
    a processor for controlling the writing of data from the cache to the non-volatile memory array and operative to enable actions including:
        starting a threshold time period when the cache contains dirty data;
        re-starting the threshold time period on receipt of one of a plurality of host commands;
        writing the dirty data to the non-volatile memory array on expiration of the threshold time period; and
        terminating the writing of dirty data to the non-volatile memory array and re-starting the threshold time period either on receipt of one of the plurality of host commands or after a last set of dirty data from the cache is written to the non-volatile memory.

16. The drive of claim 15, wherein the processor is operative to enable further actions including:
    determining the threshold time period based on a timer.

17. The drive of claim 15, wherein the processor is operative to enable further actions including:
    setting the threshold time period so that the writing of the dirty data to the non-volatile memory does not exceed a maximum number of write accesses for a predicted life span of the non-volatile memory.

18. The drive of claim 15, wherein the processor is further operative to enable actions for:
    setting the threshold time period based on the number of dirty entries in the cache or the frequency of host commands.

19. The drive of claim 15, wherein writing the dirty data to the non-volatile memory array takes place according to an amount of time that the dirty data has remained in the cache.

20. The drive of claim 15, wherein writing the dirty data to the non-volatile memory array includes application of wear-leveling techniques.

\* \* \* \* \*